United States Patent
Su et al.

(10) Patent No.: US 9,361,678 B1
(45) Date of Patent: Jun. 7, 2016

(54) COMPENSATION METHOD OF SPECTRAL MISMATCH

(71) Applicants: National Taiwan University, Taipei (TW); Himax Technologies Limited, Tainan (TW)

(72) Inventors: Po-Hsun Su, Taipei (TW); Homer H. Chen, Taipei (TW); Po-Chang Chen, Tainan (TW); Yi-Nung Liu, Tainan (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 0 days.

(21) Appl. No.: 14/689,665

(22) Filed: Apr. 17, 2015

(51) Int. Cl.
- *G06K 9/00* (2006.01)
- *G06T 5/20* (2006.01)
- *G06T 7/40* (2006.01)
- *G06T 11/00* (2006.01)

(52) U.S. Cl.
CPC . *G06T 5/20* (2013.01); *G06T 7/408* (2013.01); *G06T 11/001* (2013.01); *G06T 2207/10024* (2013.01)

(58) Field of Classification Search
CPC ............ H04N 9/045; H04N 2209/047; H04N 5/2173; H04N 5/332; G06T 3/4015
See application file for complete search history.

(56) References Cited

U.S. PATENT DOCUMENTS

| | | | | |
|---|---|---|---|---|
| 2010/0141771 A1* | 6/2010 | Hu | ................... | H01L 27/14621 348/164 |
| 2012/0098975 A1* | 4/2012 | Chao | ................... | H04N 5/3572 348/187 |
| 2012/0147468 A1* | 6/2012 | Bell | ....................... | G02B 5/201 359/491.01 |
| 2013/0135500 A1* | 5/2013 | Theuwissen | ......... | H04N 5/2173 348/242 |
| 2013/0335783 A1* | 12/2013 | Kurtz | ..................... | G06K 1/121 358/3.28 |
| 2014/0184863 A1* | 7/2014 | Tu | ............................ | H04N 9/07 348/280 |

* cited by examiner

*Primary Examiner* — Phuoc Tran
(74) *Attorney, Agent, or Firm* — Donald E. Stout; Stout, Uxa & Buyan, LLP

(57) ABSTRACT

A compensation method of spectral mismatch for a color filter array (CFA) comprising of white, red, green, and blue (WRGB) color filters includes introducing an offset representing spectral mismatch to modify a linear model that relates a W component of a pixel to R, G, and B components of the pixel. In one embodiment, an estimated offset is generated according to readout component images, and a compensated component image is generated according to the estimated offset and a corresponding readout component image.

16 Claims, 4 Drawing Sheets

COMPENSATION METHOD OF SPECTRAL MISMATCH

BACKGROUND OF THE INVENTION

1. Field of the Invention

The present invention generally relates to image processing, and more particularly to compensation of spectral mismatch to enhance WRGB demosaicking.

2. Description of Related Art

The Bayer color filter array (CFA) shown in FIG. 1A is widely adopted for digital cameras and smart phones. FIG. 1B shows a WRGB CFA that inserts white (panchromatic) pixels to the Bayer pattern. The introduction of white pixels to the CFA significantly increases the sensitivity of the image sensor and enhances the image quality, especially under low imaging illumination. Moreover, the manufacturing cost of the WRGB CFA is less than that of other competing CFAs.

To determine the missing color components for each pixel of an image, many existing methods for WRGB demosaicking employ a linear model to relate the white (W) component of a pixel to its red (R), green (G), and blue (B) components. Since the readout value of a pixel is the integration of the product of the spectral sensitivity function of the pixel and the spectrum of the incident light, the linear model assumes that a perfect linear relationship exists between the spectral sensitivity functions of W, R, G, and B pixels. In practice, however, the assumption is not necessarily true. FIG. 2 shows the four individual spectral sensitivity curves measured for a WRGB complementary metal-oxide-semiconductor (CMOS) sensor and the spectral sensitivity curve of the white pixel estimated from the R, G, and B pixels based on a linear model. It can be clearly seen that the estimated white spectral sensitivity function is not equal to the actual spectral sensitivity function of the white pixel. The discrepancy between the estimated white spectral sensitivity function and the actual spectral sensitivity function of the white pixel is referred to as spectral mismatch. The existence of such spectral mismatch seriously affects the effectiveness of the linear model for demosaicking.

SUMMARY OF THE INVENTION

In view of the foregoing, it is an object of the embodiment of the present invention to propose a novel method that introduces a spectrally dependent offset to the linear model to compensate for the spectral mismatch and thereby reduces the effect of spectral mismatch on WRGB demosaicking.

According to one embodiment, an offset representing spectral mismatch is introduced to modify a linear model that relates a white (W) component of a pixel to red (R), green (G), and blue (B) components of the pixel. Readout component images are obtained from an image sensor with the WRGB CFA. An estimated offset is generated according to the readout component images, and a compensated component image is generated according to the estimated offset and a corresponding readout component image.

DETAILED DESCRIPTION OF THE INVENTION

Figure 3:
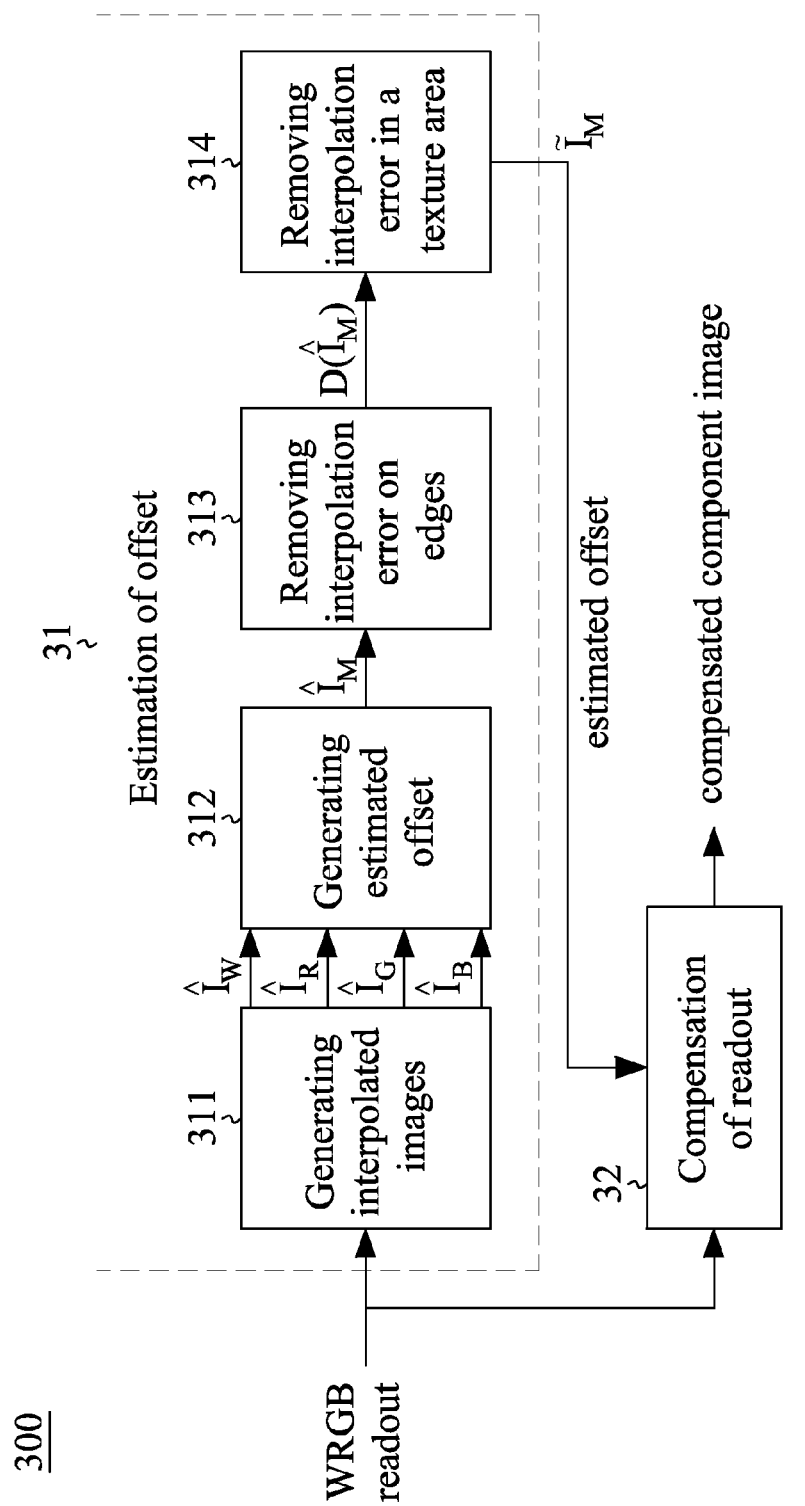
FIG. 3 shows a block diagram illustrating a compensation method of spectral mismatch for a color filter array (CFA) comprising of white, red, green, and blue (WRGB) color filters according to a first embodiment of the present invention.

FIG. 3 shows a block diagram illustrating a compensation method 300 of spectral mismatch for a color filter array (CFA) comprising of white, red, green, and blue (WRGB) color filters according to a first embodiment of the present invention. The embodiment can compensate the effect of spectral mismatch on demosaicking and greatly enhances the accuracy of R, G, and B interpolation (or demosaicking). Therefore, the embodiment can be applied as a preprocessing step to most existing WRGB demosaicking techniques that are based on the linear model to achieve significant performance. The blocks shown in FIG. 3 may be implemented by hardware (e.g., circuitry) or software (e.g., performed in a digital signal processor).

In the presence of spectral mismatch, the W component of a pixel cannot be expressed as a linear combination of the R, G, and B components. In the embodiment, the linear model is modified by introducing an offset $I_M(n)$ as follows:

$$I_W(n) = \alpha I_R(n) + \gamma I_G(n) + \beta I_B(n) + I_M(n) \qquad (1)$$

where $n \in Z^2$ denotes the location of a pixel in an image, $I_W(n)$, $I_R(n)$, $I_G(n)$, and $I_B(n)$ denote the white, red, green, and blue component images, respectively, and $\alpha$, $\beta$, and $\gamma$ denote weights. The offset $I_M(n)$ is spectrally dependent as it is the result of spectral mismatch.

Let $\lambda$ denote wavelength and $C \in \{W, R, G, B\}$. According to the image formation model, a component image $I_C(n)$ is the integration of the product of the spectrum $L(\lambda, n)$ of the incident light and the spectral sensitivity function $S_C(\lambda)$ of the image sensor. That is, $$I_C(n) = \int L(\lambda, n) S_C(\lambda) d\lambda \qquad (2)$$

Representing the W, R, G, and B component images by (2), we may rewrite (1) as follows:

$$I_M(n) = \int L(\lambda, n) S_M(\lambda) d\lambda \qquad (3)$$

where $$S_M(\lambda) = S_W(\lambda) - \alpha S_R(\lambda) - \gamma S_G(\lambda) - \beta S_B(\lambda) \qquad (4)$$

In other words, the offset is considered an image formed by a sensor with a spectral sensitivity function $S_M(\lambda)$.

Figures 1A, 1B, 2:
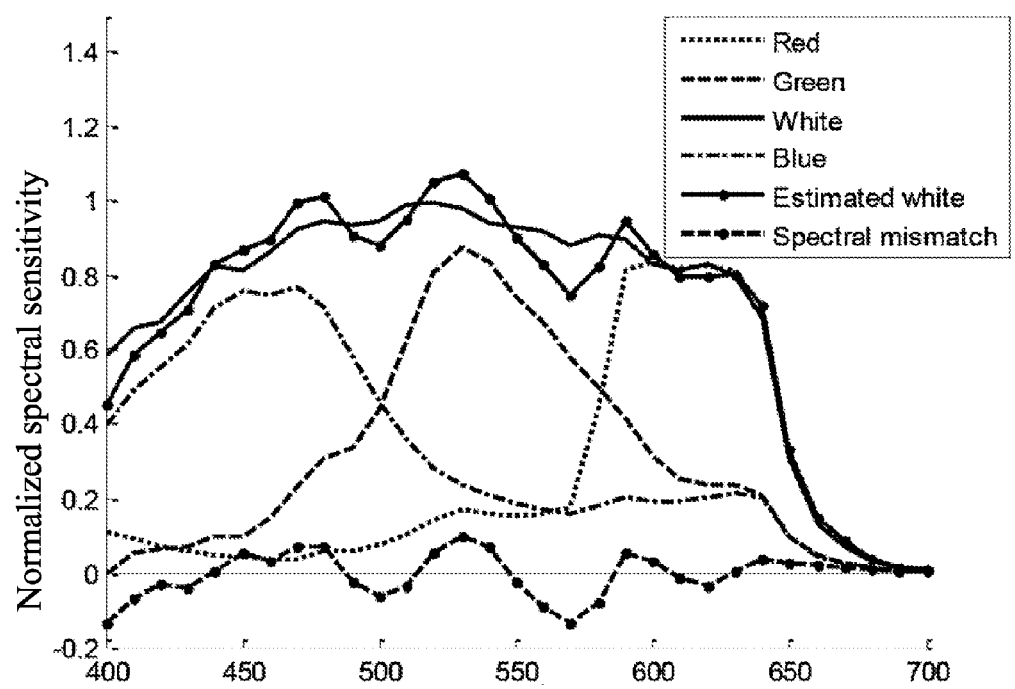
FIG. 1A shows a Bayer CFA.
FIG. 1B shows a WRGB CFA.
FIG. 2 shows the four individual spectral sensitivity curves measured for a WRGB CMOS sensor and the spectral sensitivity curve of the white pixel estimated from the R, G, and B pixels based on a linear model.

It is observed from FIG. 2 that the absolute value of the spectral mismatch is always smaller than the spectral sensitivity function of the white pixel. We leverage this relationship for refining spectral mismatch compensation and mathematically express it by $$|S_M(\lambda)| \leq \mu S_W(\lambda) \qquad (5)$$

where $$\mu = \max_{\lambda}(|S_M(\lambda)|/S_W(\lambda)) \qquad (6)$$

An upper bound on the absolute value of the offset can then be derived in terms of the white component image as follows:

$$|I_M(n)| \le \int L(\lambda,n)|S_M(\lambda)|\lambda \le \mu \int L(\lambda,n)S_W(\lambda)d\lambda = \mu I_W \quad (7)$$

According to the embodiment, the compensation method 300 primarily includes two steps: 1) generating an estimated offset according to readout component images (i.e., W, R, G, and B) (block 31); and 2) generating a compensated component image (e.g., W) according to the estimated offset and the corresponding readout component image (block 32).

Specifically speaking, block 311 (FIG. 3) performs an interpolation of the W, R, G, and B images output from a WRGB image sensor. Denote the four readout images by $\tilde{I}_C(n)$, $$\tilde{I}_C(n) = I_C(n)F_C(n) \quad (8)$$

where $C \in \{W,R,G,B\}$ and $F_C(n)$ denotes the sampling function of the CFA. The interpolated image $\hat{I}_C(n)$ and the interpolation error $E_C(n)$ are obtained by $$\hat{I}_C(n) = \tilde{I}_C(n) * \hat{I}_C(n) \quad (9)$$

$$E_C(n) = I_C(n) - \hat{I}_C(n) \quad (10)$$

where, in the embodiment, $h_C(n)$ is a linear low pass filter and * denotes convolution. In block 312 (FIG. 3), using (1) to compute the initial estimate of the offset $\hat{I}_M(n)$ and letting $$E_M(n) = \alpha E_R(n) + \gamma E_G(n) + \beta E_B(n) - E_W(n) \quad (11)$$

we have $$\hat{I}_M(n) = \hat{I}_W(n) - \alpha \hat{I}_R(n) - \gamma \hat{I}_G(n) - \beta \hat{I}_B(n)$$

$$= I_M(n) + (\alpha E_R(n) + \gamma E_G(n) + \beta E_B(n) - E_W(n))$$

$$= I_M(n) + E_M(n) \quad (12)$$

Now we discuss how to reduce the interpolation error in (11). Because interpolation error is the difference between latent image and a low-passed latent image, it can be considered a high-passed latent image. Thus, interpolation errors can be found at sharp edges, and can be effectively removed by a spatial filter such as a median filter (block 313 in FIG. 3).

Figure 4:
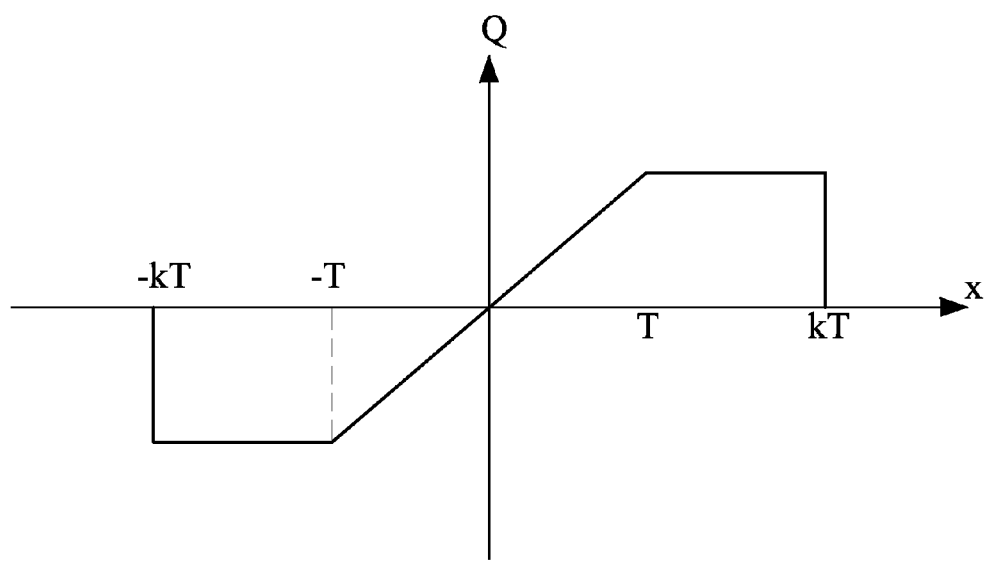
FIG. 4 shows a function used in block 314 of FIG. 3.

Subsequently, in block 314 (FIG. 3), we further refine the estimate according to theoretical bound (7). Let $T = \mu \hat{I}_W(n)$ be the bound of the offset for a pixel. We define a piecewise function by $$Q(x, T) = \begin{cases} 0, & \text{if } kT < |x| \\ \text{sign}(x)T, & \text{if } T < |x| \le kT \\ x, & \text{if } |x| \le T \text{ or } T/\mu \ge 255 \end{cases} \quad (13)$$

where x denotes the estimate of the offset for a pixel and k denotes an empirically predetermined constant. The function shown in FIG. 4 works as follows. If the estimate far exceeds the bound, it is likely that the corresponding pixel is located in a high frequency texture area. Hence x is set to zero. This effectively turns off the spectral mismatch compensation. If the estimate exceeds the bound by a small amount, the magnitude of x is set to T. This helps reduce the estimation error. When the estimate is within the bound or when $\hat{I}_W(n)$ saturates, no change is made to x. The refined estimate $\tilde{I}_M(n)$ is computed by $$\tilde{I}_M(n) = Q(D(\hat{I}_M(n)), \mu \hat{I}_W(n)) \quad (14)$$

where $D(\cdot)$ denotes median filtering.

Subsequently, block 32 in FIG. 3 performs spectral mismatch compensation. Although the white pixel is demonstrated, it is appreciated that the compensation may be performed on other pixels (i.e., red, green, and blue pixels). Specifically, the compensation is done by subtracting the offset estimate from the readout value of the corresponding white pixel. Denote the compensated white pixel value by $\tilde{I}_W(n)$. We have $$\tilde{I}_W(n) = \tilde{I}_W(n) - \tilde{I}_M(n)F_W(n)$$

$$= (I_W(n) - \tilde{I}_M(n))F_W(n)$$

$$= (\alpha I_R(n) + \gamma I_G(n) + (n) + \beta I_B(n) + \tilde{E}_M(n) - F_W(n)) \quad (15)$$

where $$\tilde{E}_M(n) = I_M(n) - \tilde{I}_M(n) \quad (16)$$

Because the residual $\tilde{E}_M(n)$ is close to zero for homogenous area and isolated edge and because the demosaicking artifact is less noticeable in the high frequency texture area, we can assume that $\tilde{E}_M(n)$ equals zero in the demosaicking process and relate the compensated white pixel value to the latent R, G, and B pixel value by $$\tilde{I}_W(n) = (\alpha I_R(n) + \gamma I_G(n) + \beta I_B(n))F_W(n) \quad (17)$$

Figure 5:
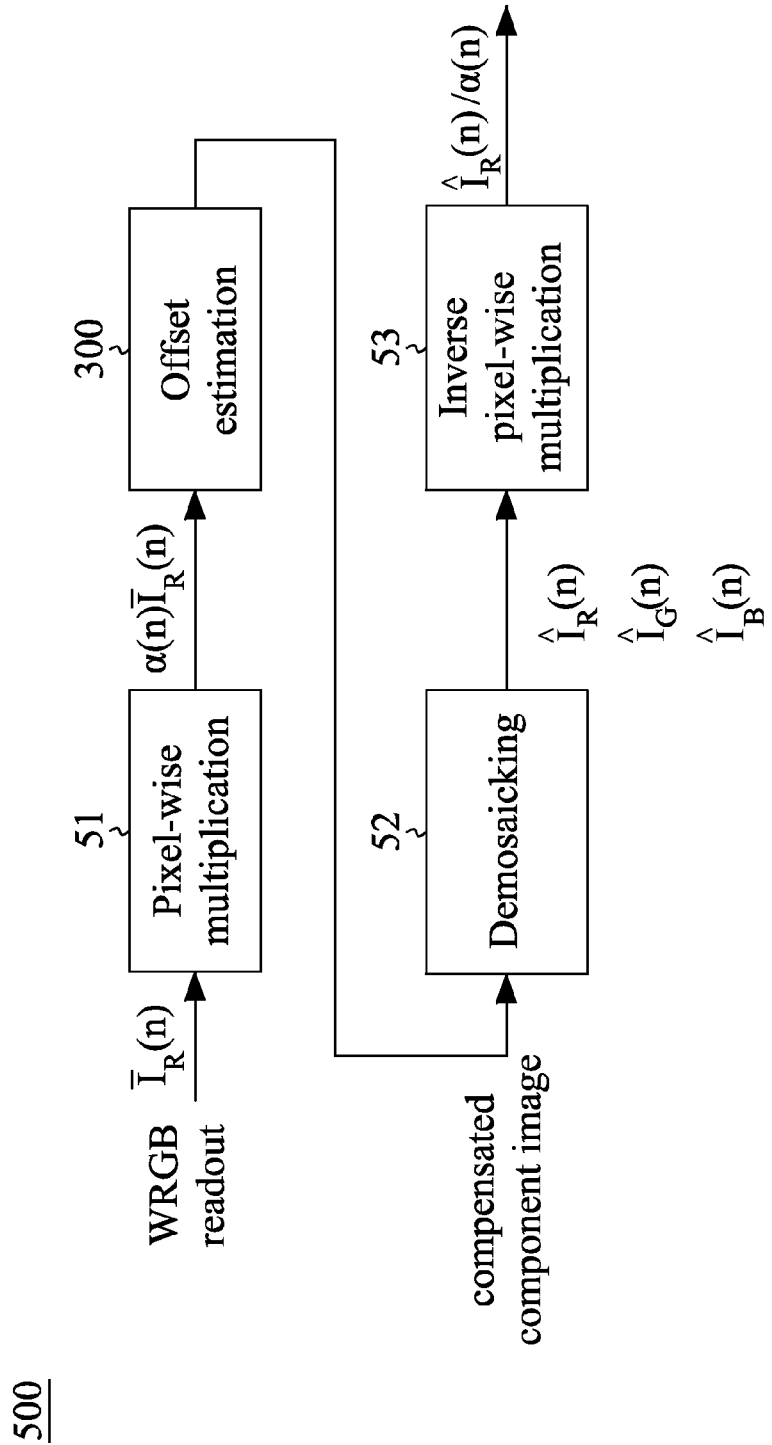
FIG. 5 shows a block diagram illustrating a demosaicking method with compensation of spectral mismatch according to a second embodiment of the present invention.

FIG. 5 shows a block diagram illustrating a demosaicking method 500 with compensation of spectral mismatch according to a second embodiment of the present invention. In block 51, pixel-wise multiplication is performed on the readout component image $\tilde{I}_R(n)$, $\tilde{I}_G(n)$ or $\tilde{I}_B(n)$ to result in a multiplied readout image. Although the readout red image $I_R(n)$ is exemplified in FIG. 5, it is appreciated that the pixel-wise multiplication may be performed on other readout component image $\tilde{I}_G(n)$ or $\tilde{I}_B(n)$. It is noted that, in the embodiment, the readout white image is not processed by block 51. In one exemplary embodiment, the pixel-wise multiplication in block 51 may be carried out by a lookup table (LUT) that stores multipliers (e.g., a (n) for the readout red image) associated with corresponding pixels. The multipliers stored in the LUT may be empirically obtained, for example, by testing the image sensor.

Subsequently, the multiplied readout image is subjected to offset compensation (block 300) as detailed in the previous embodiment. The compensated component images are then subjected to demosaicking (block 52) to result in demosaicked images.

Finally, in block 53, inverse pixel-wise multiplication (or division) is performed on the demosaicked image. The inverse pixel-wise multiplication in block 53 performs the inverse operation of the pixel-wise multiplication in block 51. In one exemplary embodiment, the inverse pixel-wise multiplication in block 53 may be carried out by a lookup table (LUT).

Although specific embodiments have been illustrated and described, it will be appreciated by those skilled in the art that various modifications may be made without departing from the scope of the present invention, which is intended to be limited solely by the appended claims.

What is claimed is:

1. A compensation method of spectral mismatch for a color filter array (CFA) comprising of white, red, green, and blue (WRGB) color filters, the method comprising:
   introducing an offset representing spectral mismatch to modify a linear model that relates a white (W) component of a pixel to red (R), green (G), and blue (B) components of the pixel;
   obtaining readout component images from an image sensor with the WRGB CFA;
   generating an estimated offset according to the readout component images; and generating a compensated component image according to the estimated offset and a corresponding readout component image.

2. The method of claim 1, wherein the W component of the pixel is a sum of the offset and a weighted sum of the R, G, and B components.

3. The method of claim 1, wherein the generation of the estimated offset comprises:
generating interpolated images according to the readout component images respectively; and
generating the estimated offset according to the interpolated images.

4. The method of claim 3, wherein the interpolated images are generated by using a low pass filter.

5. The method of claim 3, wherein the estimated offset is generated by subtracting weighted sum of interpolated R, G, and B images from an interpolated W image.

6. The method of claim 3, wherein interpolation error is generated while the estimated offset is generated.

7. The method of claim 6, wherein the generation of the estimated offset further comprises:
removing the interpolation error on edges.

8. The method of claim 7, wherein the interpolation error on edges is removed by using a median filter.

9. The method of claim 7, wherein the generation of the estimated offset further comprises:
refining the estimated offset to remove the interpolation error in a texture area.

10. The method of claim 9, wherein the estimated offset is refined by a piecewise function.

11. The method of claim 10, wherein a magnitude of the estimate offset is set to a constant if an absolute value of the estimate offset is greater than an upper bound.

12. The method of claim 11, wherein the estimated offset is maintained if the absolute value of the estimate offset is less than or equal to the upper bound; the magnitude of the estimate offset is set to the upper bound if the absolute value of the estimate offset is greater than the upper bound but less than or equal to a predetermine threshold; and the magnitude of the estimate offset is set to zero if the absolute value of the estimate offset is greater than the predetermined threshold.

13. The method of claim 1, wherein the generation of the compensated component image is performed by subtracting the estimated offset from the corresponding readout component image.

14. The method of claim 3, before generating the interpolated images, further comprising:
performing pixel-wise multiplication on the readout component images.

15. The method of claim 14, further comprising:
demosaicking the compensated component image to result in a demosaicked image; and
performing inverse pixel-wise multiplication on the demosaicked image;
wherein the inverse pixel-wise multiplication performs an inverse operation of the pixel-wise multiplication.

16. The method of claim 15, wherein the pixel-wise multiplication and the inverse pixel-wise multiplication are carried out by lookup tables.

* * * * *